(12) United States Patent
Hoehn, Jr. et al.

(10) Patent No.: US 6,395,415 B1
(45) Date of Patent: May 28, 2002

(54) SENSOR MOUNT ASSEMBLY FOR A FUEL CELL SYSTEM

(75) Inventors: James G. Hoehn, Jr., Albany; Bryan P. Whalen, Troy, both of NY (US)

(73) Assignee: Plug Power, Inc., Latham, NY (US)

( * ) Notice: Subject to any disclaimer, the term of this patent is extended or adjusted under 35 U.S.C. 154(b) by 0 days.

(21) Appl. No.: 09/472,761

(22) Filed: Dec. 27, 1999

(51) Int. Cl.[7] .......................... H01M 8/04; G01D 21/00
(52) U.S. Cl. .......................... 429/22; 429/24; 73/756; 73/866.5
(58) Field of Search .................. 429/22–25; 73/756, 73/866.5; 285/93

(56) References Cited

U.S. PATENT DOCUMENTS

| | | | |
|---|---|---|---|
| 3,847,778 A | * | 11/1974 | Riddel |
| 5,605,360 A | * | 2/1997 | Kurisaki et al. |
| 5,677,073 A | * | 10/1997 | Kawatsu |
| 5,897,766 A | * | 4/1999 | Kawatsu |
| 6,000,290 A | * | 12/1999 | Benton et al. |

FOREIGN PATENT DOCUMENTS

JP     62-47967 A   *   3/1987

* cited by examiner

Primary Examiner—Gabrielle Brouillette
Assistant Examiner—Susy Tsang-Foster
(74) Attorney, Agent, or Firm—Trop, Pruner & Hu, P.C.

(57) ABSTRACT

An assembly includes a receptacle and a sensor body. The receptacle includes an orifice for receiving the sensor body. At least one tab is located on the receptacle or sensor body to engage a feature such as a notch on the other. The sensor body is adapted to be inserted into the orifice. At least one prominence may be included on the receptacle or sensor body to lift the tab(s) out of the feature to release the sensor body from the receptacle when the sensor body is rotated with respect to the receptacle.

9 Claims, 6 Drawing Sheets

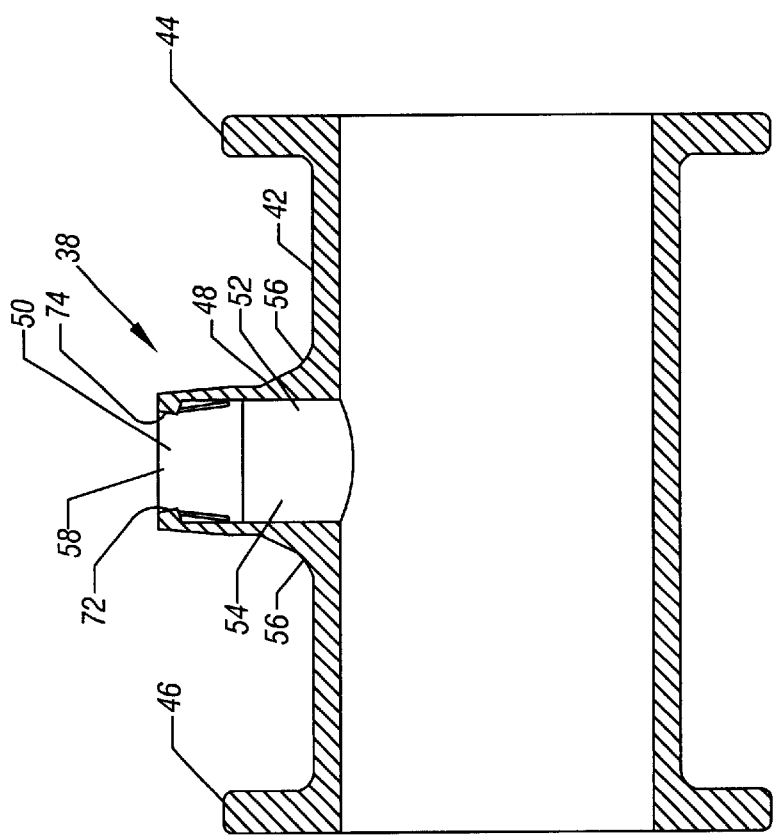
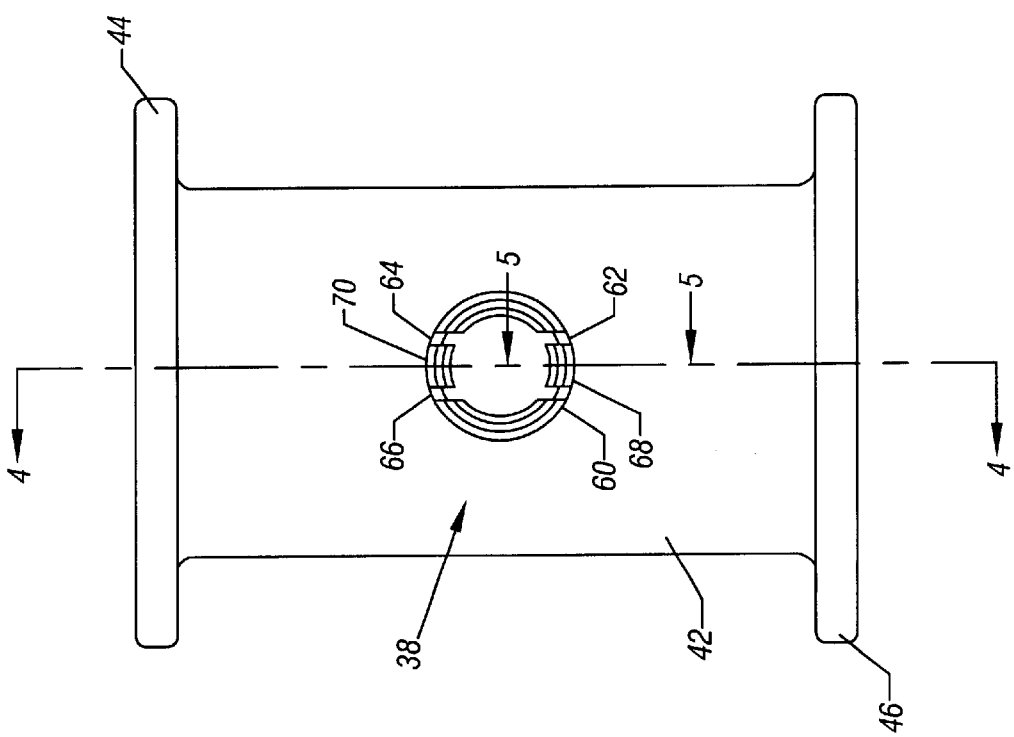
FIG. 4
FIG. 3

SENSOR MOUNT ASSEMBLY FOR A FUEL CELL SYSTEM

BACKGROUND

The invention generally relates to a sensor mount assembly.

Many devices, such as fuel cells, use fluids to conduct heat or perform other functions in the device. Monitoring temperature, pressure and other properties of these fluids may require the use of a sensor. It is desirable that the sensor be mounted in a manner that is inexpensive and easy to manufacture, as well as easy to use.

A fuel cell is an electrochemical device that converts chemical energy produced by a reaction directly into electrical energy. For example, one type of fuel cell includes a proton exchange membrane (PEM), often called a polymer electrolyte membrane, that permits only protons to pass between an anode and a cathode of the fuel cell. At the anode, diatomic hydrogen (a fuel) is reacted to produce hydrogen protons that pass through the PEM. The electrons produced by this reaction travel through circuitry that is external to the fuel cell to form an electrical current. At the cathode, oxygen is reduced and reacts with the hydrogen protons to form water. The anodic and cathodic reactions may be described by the following equations:

$H_2 \rightarrow 2H^+ + 2e^-$ at the anode of the cell, and $O_2 + 4H^+ + 4e^- \rightarrow 2H_2O$ at the cathode of the cell.

Because a single fuel cell typically produces a relatively small voltage (around 1 volt, for example), several serially connected fuel cells may be formed out of an arrangement called a fuel cell stack to produce a higher voltage. The fuel cell stack may include different flow plates that are stacked one on top of the other in the appropriate order, and each plate may be associated with more than one fuel cell of the stack. The plates may be made from a graphite composite or metal material and may include various flow channels and orifices to route the above-described reactants and products through the fuel cell stack. Several PEMs (each one being associated with a particular fuel cell) may be dispersed throughout the stack between the anodes and cathodes of the different fuel cells. The anode and the cathode may each be made out of an electrically conductive gas diffusion material, such as a carbon cloth or paper material, for example. Besides communicating products and reactants throughout the stack, the flow channels may also communicate a coolant to remove heat from the stack.

The reformate (containing the hydrogen), air and coolant that circulate through a fuel cell stack are examples of working fluids. The temperature and other properties of the working fluids, such as the reformate, may be monitored to maintain desired operating conditions. Ideally, the sensors that are employed for this purpose should be mounted in fixtures that are easy to manufacture, inexpensive, and that allow the sensor to be quickly installed and removed.

SUMMARY

In an embodiment of the invention, an assembly includes a receptacle and a sensor body. The receptacle includes an orifice and includes at least one tab for engaging a feature (e.g., a notch) of the sensor body. In another embodiment, the tab may be located on the sensor body and may be adapted to engage a feature of the receptacle. The sensor body is adapted to be inserted into the orifice. The sensor body includes a notch to receive the tab(s) to secure the sensor body in the receptacle and at least one prominence to lift the tab(s) out of the notch to release the sensor body from the receptacle when the sensor body is rotated.

Advantages and other features of the invention will become apparent from the following description, from the drawing and from the claims.

BRIEF DESCRIPTION OF THE DRAWING

FIG. 3 is a top plan view of the receptacle of FIG. 2.

FIG. 4 is a through section of the receptacle, taken along line 4—4 of FIG. 3.

DETAILED DESCRIPTION

Figure 1:
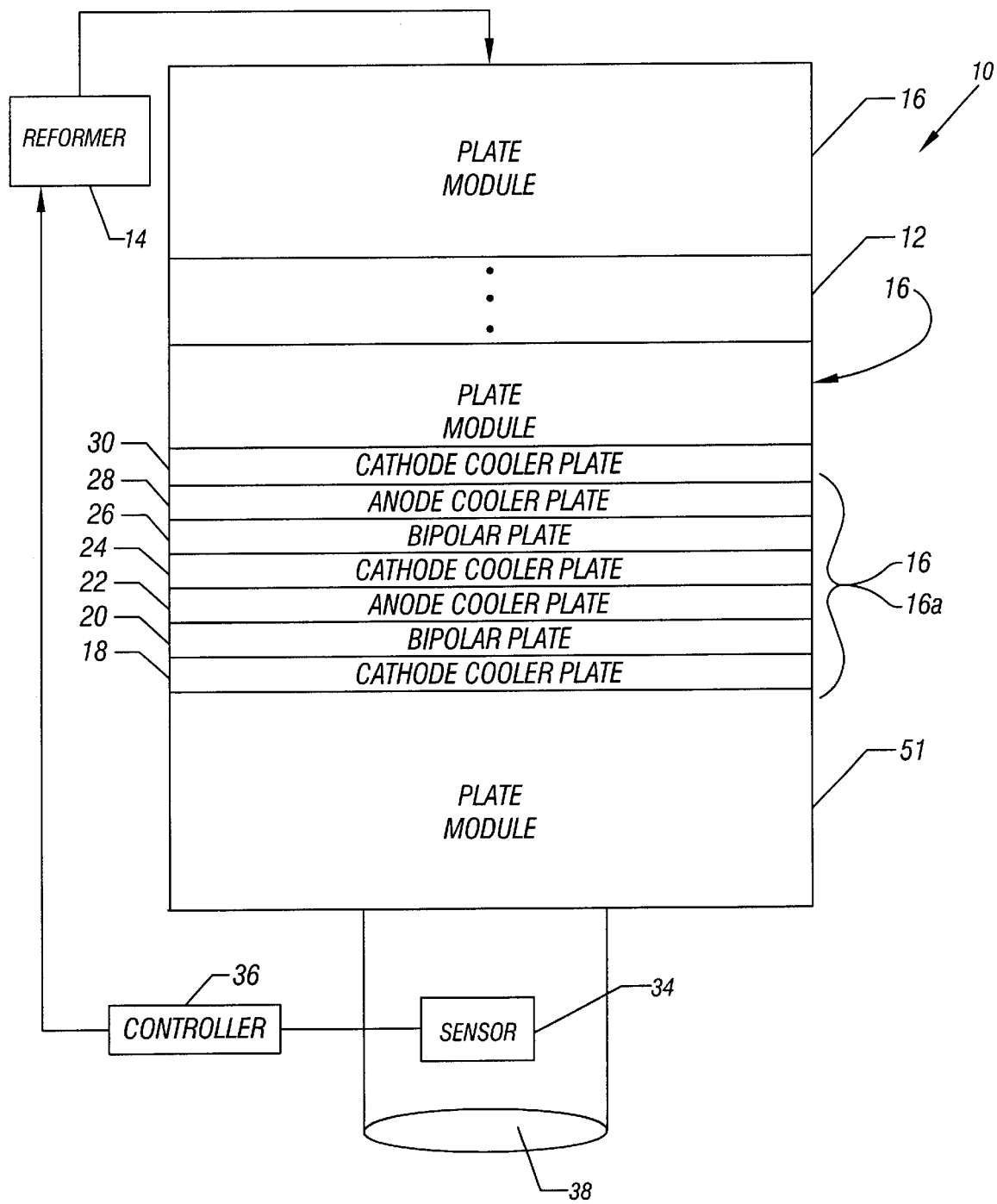
FIG. 1 is a schematic diagram illustrating a fuel cell stack with coolant system and sensor.
Figure 2:
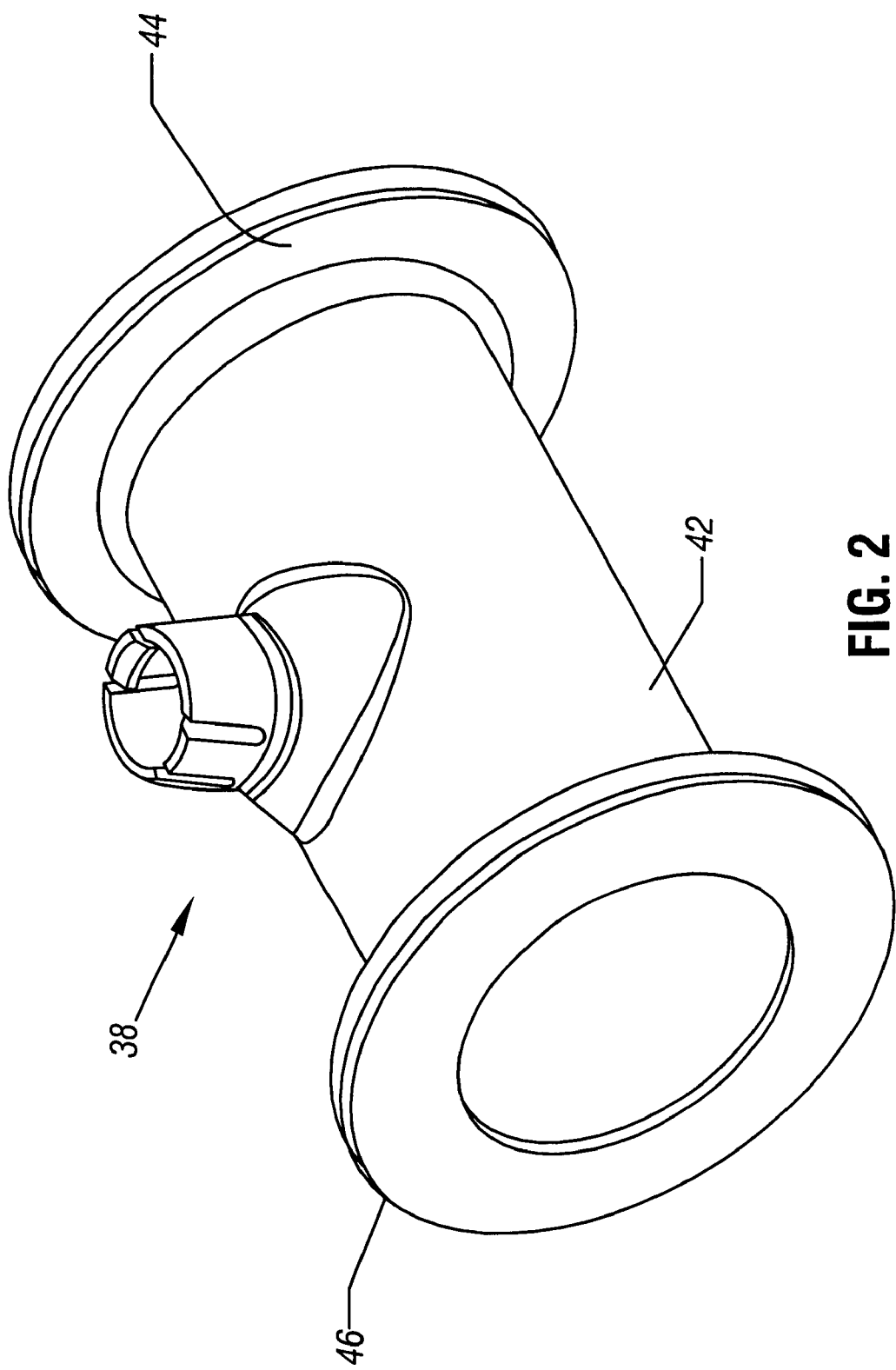
FIG. 2 is a perspective view of a receptacle of a sensor mount according to the present invention.
Figure 5:
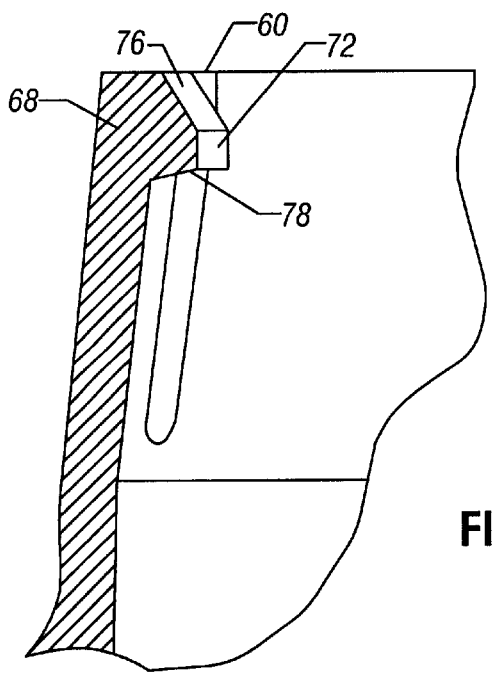
FIG. 5 is an enlarged through section of a tab, taken along line 5—5 of FIG. 3.

Referring to FIG. 1, an embodiment of a fuel cell system 10 includes a working fluid subsystem connected to a fuel cell stack 12. The working fluid subsystem may include stack components (described below) that are designed to pass fluids, such as (reformate containing hydrogen), air or a coolant, as examples.

The working fluid subsystem is formed in part by plates (of the stack 12) that include flow channels for circulating the working fluids and manifold passageways (of the stack 12) that communicate the working fluid through the fuel cell system 10. The fuel cell stack 12 may be formed from repeating units called plate modules 16. An exemplary plate module 16a (having a design similar to the other plate modules 16) includes flow plates (graphite composite or metal plates, for example) that include flow channels to form several fuel cells. The flow plates also include aligned openings to form passageways of a manifold that communicates reactants such as hydrogen and air and the coolant with the stack 12. As an example, the plate module 16a may include the following flow plates: bipolar plates 20 and 26; cathode cooler plates 18, 24 and 30; and anode cooler plates 22 and 28.

An exemplary working fluid subsystem for hydrogen is illustrated in FIG. 1. A reformer 14 converts a hydrocarbon (natural gas or propane, as examples) into a hydrogen flow that is communicated to the fuel cell stack 12 for reaction with oxygen (provided by an air flow) to produce electrical power. To control the hydrogen production by the reformer 14, a sensor 34 may be mounted in a female receptacle 38 to sense an anodic exhaust flow that exits the stack 12 through the receptacle 38. This exhaust flow may include, for example, unconsumed hydrogen. The output signal of the sensor 34 may be communicated to a controller 36 that may control the reformer 14 in response to the temperature that is indicated by the sensor 34. The sensor 34 may be any suitable sensor, typically a temperature sensor, such as a resistance temperature device (RTD) or a thermistor, but other sensors may also be used, such as pressure sense sensors or flow meters, to sense properties of the working fluid.

The sensor 34 is mounted in a quick release sensor mount assembly, illustrated in FIGS. 2 through 8. The sensor mount assembly includes the female receptacle 38, illustrated in FIG. 2, and a male sensor body 40 illustrated in FIG. 6. The sensor 34 is housed within the sensor body 40 and may include electrical circuitry 35 that is disposed within the sensor body 40 as well as a probe 80 (a metal probe, for example) that extends outside of and is secured to the sensor body 40. The female receptacle 38 is illustrated as mounted on a segment of tubing 42 having a first flange 44 and a second flange 46 at opposite ends of tubing 42. The flanges 44 and 46 may be used to mount the receptacle 38 to, for example, a manifold passageway of the stack 12 or other conduits to communicate a fluid. Thus, the receptacle 38, however, could also be used on any segment or configuration of conduit or structure containing fluid.

Referring to FIGS. 3 and 4, the receptacle 38 includes a housing 48 that is mounted on the tube 42 and includes an orifice 50 that extends through the housing 48 and opens into the interior of the tube 42. In some embodiments, the housing 48 is generally cylindrical. A proximal section 52 immediately adjacent the tube 42 has a cylindrical bore 54 extending or opening into the tube 42. Filets 56 may be provided adjacent the union of the female receptacle 38 and the tube 42 to provide additional mechanical strength and support.

A distal segment 58 of the housing 48 may be frusta-conical. An interior bore 50 of the distal segment 58 becomes slightly smaller farther away from the tube 42. The distal segment 58 is crenellated by four longitudinal slots 60, 62, 64 and 66 (see FIG. 3) that define two opposed tabs 68, 70. One of the tabs 68 can be seen in an enlarged cross-section in FIG. 5. Each of the tabs 68, 70 has an inwardly directed lip 72, 74. Each lip 72 and 74 has an upwardly or distally facing inclined face 76 and a downwardly or proximally facing abutment surface 78. As will be explained below, the tabs 68 and 70 with the associated lips 72 and 74 act to retain the sensor body 40 in the receptacle 38. The invention is not limited by the particular placement of tabs. For example, tabs might extend from the orifice of the receptacle as shown in FIG. 4, or they might extend from the sensor body 40 (not shown). Other tab configurations are possible. It will be appreciated that suitable tabs may be include snap hooks, snap beams, or other arrangements, and that the tabs can be flat or annular.

In some embodiments, the housing 48 may be a plastic that is formed by injection molding. Each tab 68, 70 has a sufficient resiliency to grasp and release the sensor body 40, as described herein. Of course, the tabs 68 and 70 may be constructed from materials other than plastic as long as long as the tabs 68 and 70 remain sufficiently resilient to grasp and release the sensor body 40. It can be appreciated by those skilled in the art that because the receptacle 38 does not include threads for establishing a threaded connection with the sensor body 40, the receptacle 38 may be easier to manufacture via injection molding than conventional sensor mount assemblies that use threaded connections, and may be easier to install (e.g., may not require rotation for installation).

Figure 6:
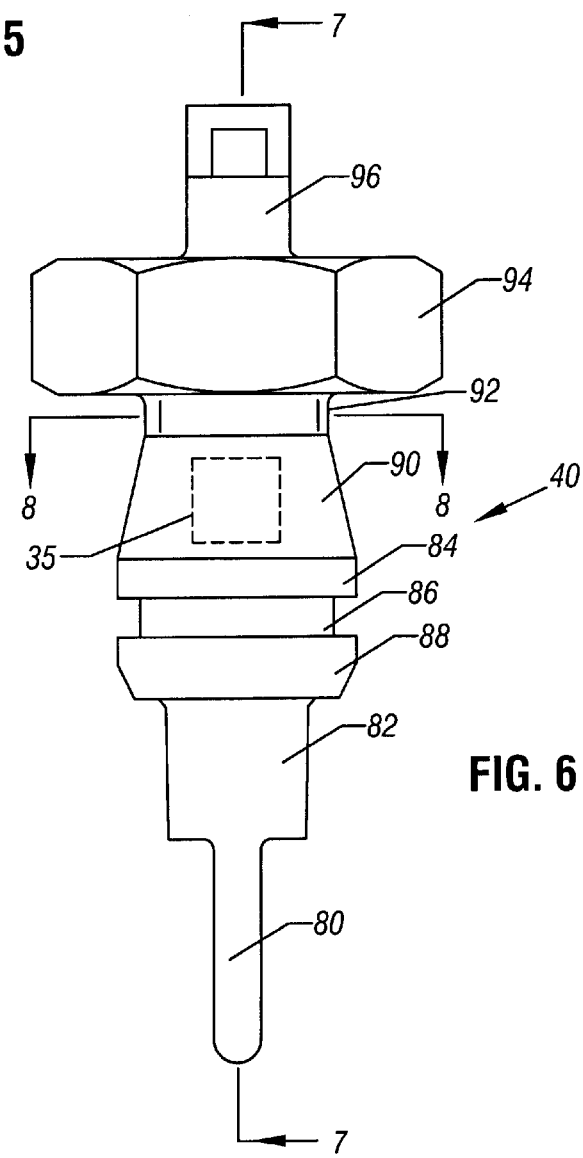
FIG. 6 is a plan view of a sensor body of the sensor mount according to the present invention.
Figure 7:
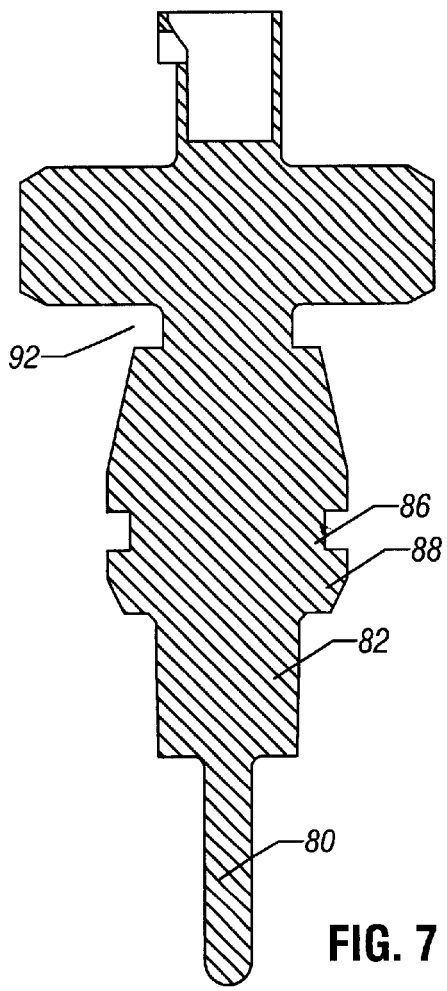
FIG. 7 is a through section of the sensor body, taken along line 7—7 of FIG. 6.

Turning now to the sensor body 40, a temperature sensor is illustrated in FIG. 6. As explained above, any suitable sensor may be used with this invention, including, without limitation, flow sensors, pressure sensors and so on. The illustrated sensor body 40 may be made from an injection molded plastic (as an example) and may secure the probe 80 that extends proximally from a shaft 82 of the sensor body 40. A main body 84 of the sensor body 40 is connected distally from the shaft and is generally configured to fit snugly in the orifice 50. The main body 84 has a circumferential o-ring groove 86 for receiving an elastomeric o-ring, for sealably seating the sensor body 40 in the receptacle 38. A chamfer 88 may be provided on the main body 84 proximally, adjacent the shaft 82. A frusta-conical section 90 is provided distally from the main body 84. This frusta-conical section 90 corresponds generally to the interior shape of the frusta-conical segment 58 of the receptacle 38. A circumferential notch 92 distal from the frusta-conical segment 90 receives the lips 72, 74 on the tabs 68, 70. This action snaps the sensor body 40 into the receptacle 38.

A handle such as hexagonal head 94 above the notch 92 is provided so that the body 40 may be rotated to release it from the receptacle, as will be explained below. A connector 96 provides an electrical connection for a conductor (not shown) between the sensor and the controller 36, for example. Of course, other forms of connectors would be used for different types of sensors such as, hydrogen, pressure or carbon monoxide sensors, as examples.

Figure 8:
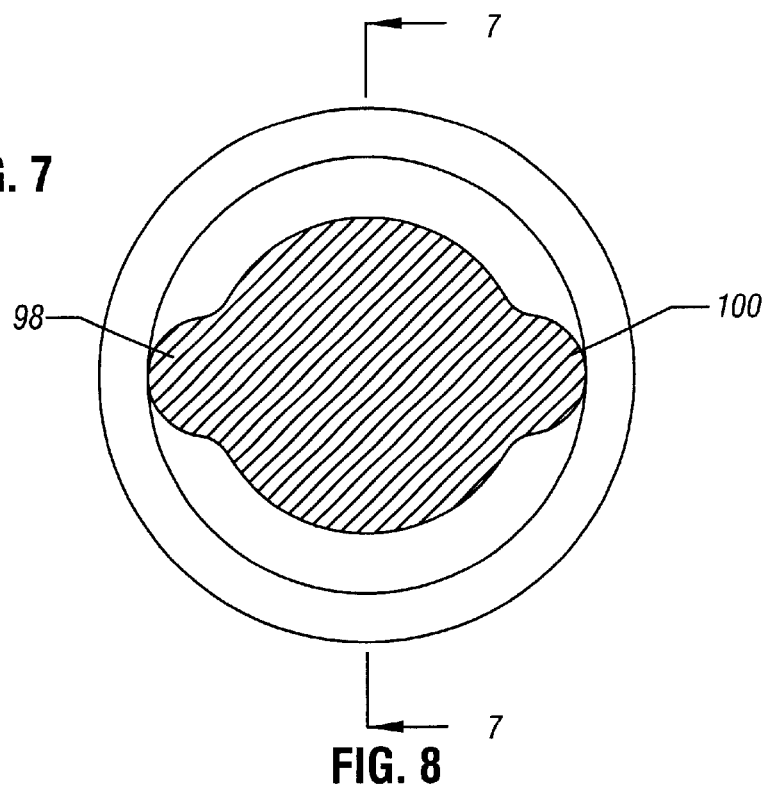
FIG. 8 is an enlarged through section of the sensor body, taken along line 8—8 of FIG. 6.

In the notch 92, two longitudinal ridges 98, 100 are provided. These ridges 98, 100 can best be seen in FIG. 8 in through section. Preferably, the ridges are generally semi-circular in cross-section, as can be seen in FIG. 8. At least one ridge 98, 100 is provided for each tab 68, 70. The ridges 98, 100, are placed in the notch such that each ridge 98, 100 will engage in associated lip 72, 74 simultaneously when the sensor body 40 is rotated. The ridges 98, 100 act to spread the tabs, disengaging the lips from the notch and allowing the sensor 40 to be withdrawn from the receptacle. Although two opposing tabs and corresponding opposing ridges have been illustrated, it is clear that a single tab and ridge could be employed or that more than two tabs and ridges could also be used without departing from the teachings of the invention.

Figure 9:
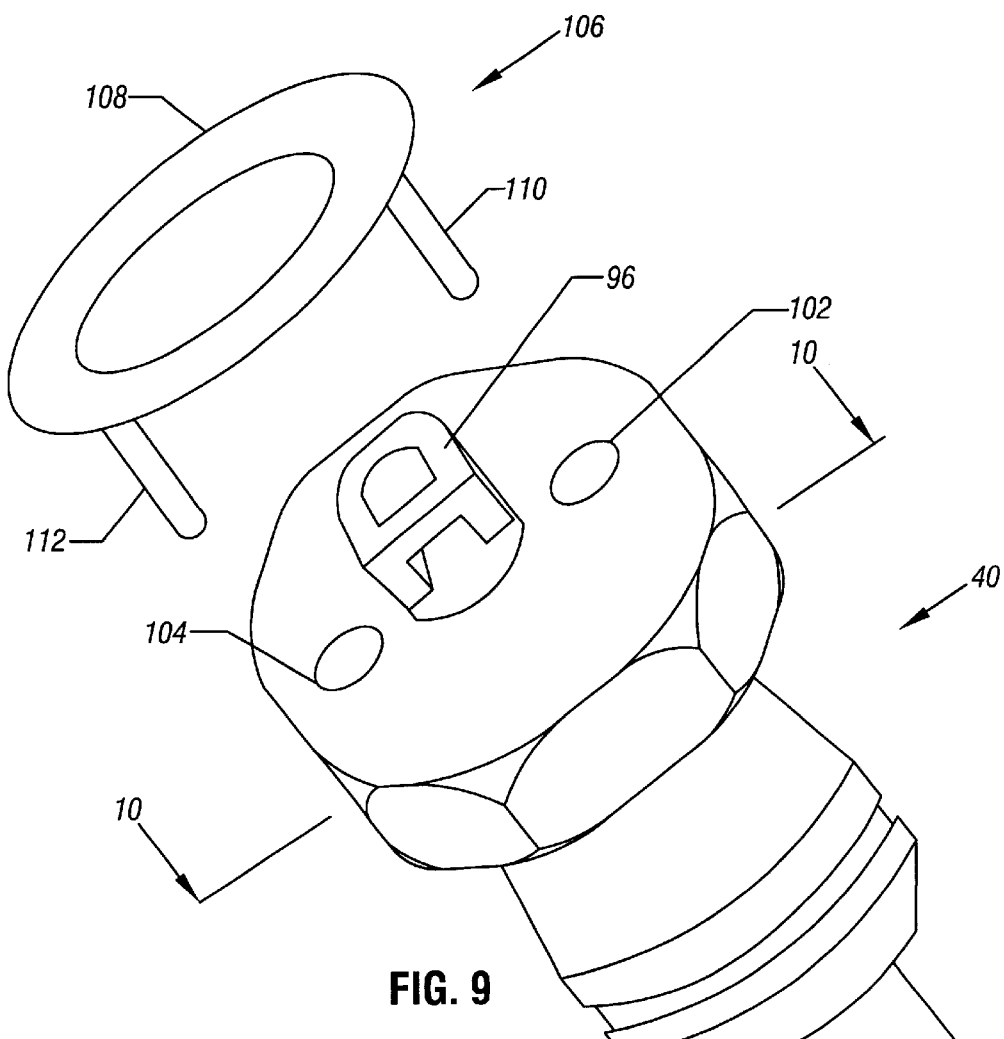
FIG. 9 is a perspective view of an alternative embodiment of the sensor body.
Figure 10:
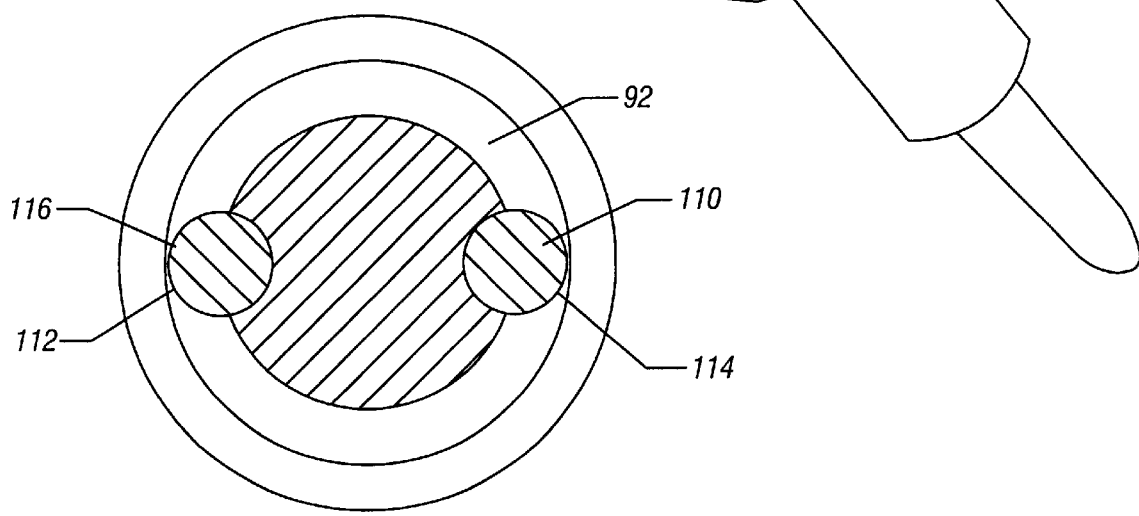
FIG. 10 is a through section of the alternative sensor body, taken along line 10—10 of FIG. 9.

An alternative embodiment of the invention is shown in perspective view in FIG. 9. Instead of ridges 98, bores 102, 104 are provided which extend through the hexagonal head 94 and into the groove 92. A key 106 is provided for releasing the sensor. The key 106 has a support ring 108 that will fit over any connector 96 on the sensor and that supports prongs 110, 112. The prongs 110, 112 are inserted into the bores 102, 104 in place of the ridges 98, 100 and removably form the same configuration as the ridges 98, 100. As can be seen in FIG. 10, with the key 106 in place, ridges 114, 116 are formed in the notch 92. The lips are thereby disengaged to allowing the sensor to be withdrawn from the receptacle. It will be appreciated that the key arrangement described above provides the advantage of tamper resistance in that the key 106 is needed to remove the sensor from the receptacle.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A fuel cell system comprising:
    a receptacle to communicate a fluid flow with the system, the receptacle including an orifice and including at least one tab projecting from the orifice; and
    a sensor body adapted to be inserted into the orifice, the sensor body including a feature to receive said at least one tab to secure the sensor body in the receptacle and at least one prominence to displace said at least one tab from the feature to release the sensor body from the receptacle in response to the sensor body being rotated.

2. The fuel cell system of claim 1, wherein said at least one tab comprises two tabs.

3. The fuel cell system of claim 2, wherein said two tabs are opposed to each other.

4. The fuel cell system of claim 1, wherein said at least one prominence comprises two opposed ridges.

5. The fuel cell system of claim 1, wherein the sensor body further comprises a bore extending longitudinally into the sensor body, at least part of said bore intersecting the feature and wherein said at least one prominence comprises at least one pin removably received in said bore.

6. The fuel cell system of claim 1, wherein the sensor body further comprises at least two bores extending longitudinally into the sensor body, at least part of the bores intersecting the feature and wherein said at least one prominence comprises at least two pins removably received in said bores.

7. The fuel cell system of claim 6, wherein said at least two pins are connected to each other.

8. The fuel cell system of claim 1, wherein the sensor body comprises a temperature sensor.

9. The fuel cell system of claim 1, wherein said at least one tab comprises:

a member having a lip to engage the feature.

* * * * *